United States Patent Office 3,097,732
Patented July 16, 1963

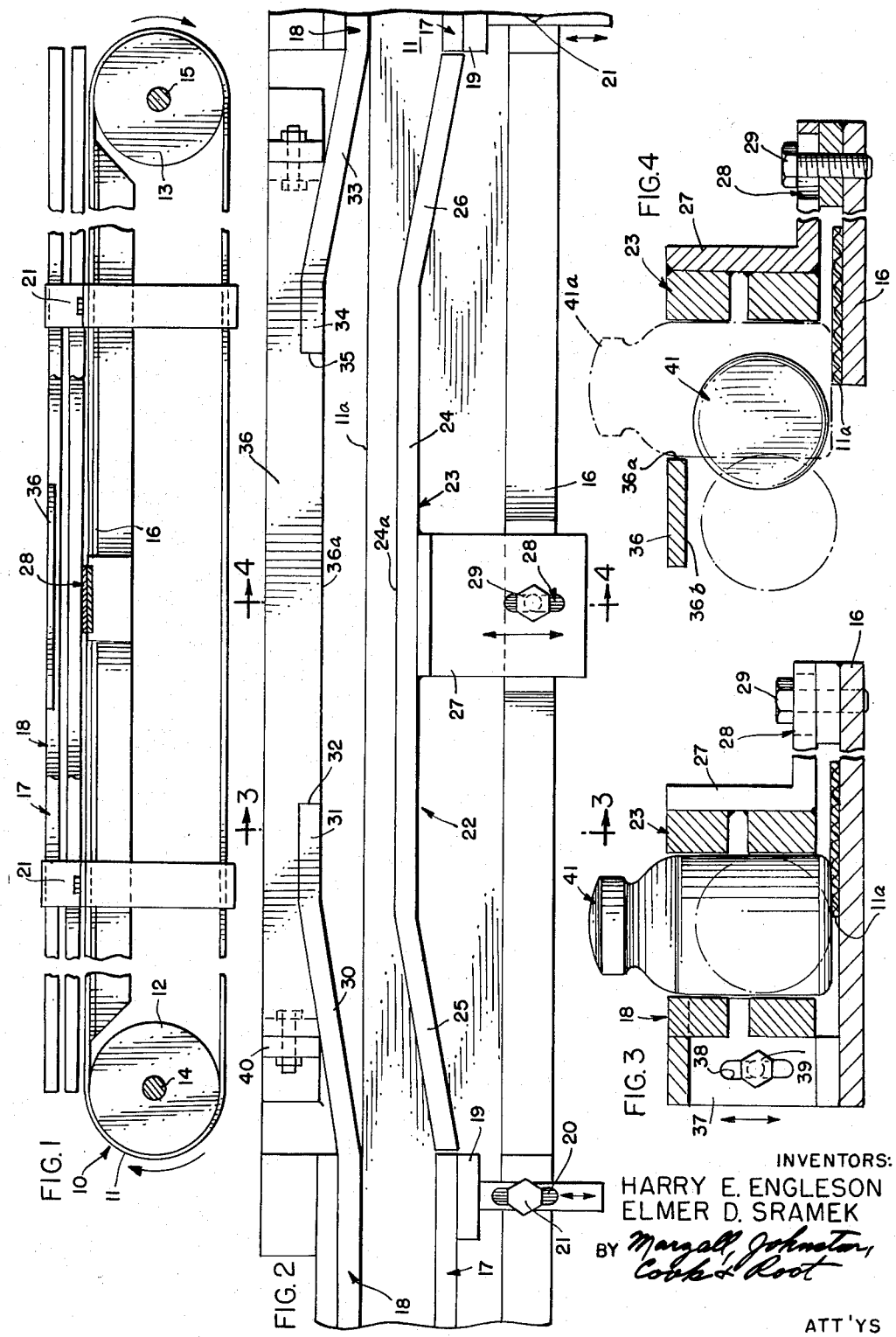

3,097,732
APPARATUS FOR REMOVING MALPOSITIONED ARTICLES FROM A CONVEYER
Harry E. Engleson, Morton Grove, and Elmer D. Sramek, Cicero, Ill., assignors, by mesne assignments, to Crompton & Knowles Corporation, Worcester, Mass., a corporation of Massachusetts
Filed Mar. 16, 1961, Ser. No. 96,328
9 Claims. (Cl. 198—33)

This invention relates in general to an apparatus for removing malpositioned articles from a conveyer, and more particularly to an apparatus for removing articles having a greater height than width from a conveyer when the articles are malpositioned thereon, and still more particularly to an apparatus for removing bottles from a conveyer when the bottles are not in upstanding position.

The present invention is especially useful in connection with a conveyer which feeds articles to a packaging or cartoning machine that packages or cartons a plurality of the articles in a single package or carton, although it may have other uses and purposes apparent to one skilled in the art. In such a packaging or cartoning machine, it is necessary to have the articles prepositioned when delivered thereto, and in the case of articles having a greater height than width, it is desired to generally have the articles in a standing position. For example, where bottles are to be packaged, the bottles must be fed to the packaging machine in an upright position, and if a bottle is fed to the machine in a lying down position, it is necessary to stop the bottle packaging machine to prevent a jam up which would be caused by it receiving a malpositioned bottle. The present invention eliminates the necessity to stop the bottle packaging machine when a bottle tips over by virtue of the fact that such a malpositioned bottle is removed from the feed conveyor prior to the time it reaches the bottle packaging machine.

Generally in such a feed conveyer, a pair of parallel spaced upstanding guide rails are arranged along the conveyer in order to guide the bottles or articles in a rectilinear path and maintain the bottles in upright position, as they are driven along by the conveyer. The invention involves including an offset section in the guide rails to carry the bottles along the edge of the conveyer. An opening is provided in the rail of the offset section that is dimensioned to permit malpositioned articles or bottles to drop out or off of the conveyer at the offset section point. Particularly, the opening is sized to be equal to a dimension slightly greater than the width of an article or bottle along the vertical and a dimension substantially greater than the height of an article or bottle along the horizontal. Accordingly, any malpositioned article or bottle will be ejected from the conveyer prior to the time that such an article or bottle would reach the carton packaging machine.

Accordingly, it is an object of this invention to provide an apparatus for removing malpositioned articles from a conveyer.

Another object of this invention resides in the provision of removing articles having a greater height than width from a conveyer if the article is tipped over.

Still another object of this invention is in the provision of an inexpensive and simply constructed apparatus for removing malpositioned articles from a moving conveyer.

A further object of this invention is to provide an apparatus for removing malpositioned articles from a conveyer including an offset section which carries the article along the edge of the conveyer and dumps the article from the conveyer if the article is malpositioned thereon.

A still further object of this invention is to provide an apparatus for use on a conveyer having guide rails upstanding therefrom for guiding articles along a substantially rectilinear path which includes an offset section to be arranged along the guide rails and guide the articles along the offset section to an edge of the conveyer so that an article may be dumped therefrom if it is not in standing position on the conveyer.

Other objects, features and advantages of the invention will be apparent from the following detailed disclosure, taken in conjunction with the accompanying sheet of drawings, wherein like reference numerals refer to like parts, in which:

FIG. 1 is a broken front elevational view of a conveyer embodying the apparatus of the present invention, and having some parts removed for purposes of clarity;

FIG. 2 is a greatly enlarged plan view of the apparatus of the invention which is arranged on the conveyer of FIG. 1;

FIG. 3 is a still more greatly enlarged transverse sectional view taken substantially along line 3—3 of FIG. 2; and FIG. 4 is a greatly enlarged transverse sectional view similar to FIG. 3 but taken substantially along line 4—4 of FIG. 2.

The present invention is illustrated in connection with use on an endless belt conveyer, but it is to be appreciated that it could be equally employed on any other type of conveyer which would provide a surface along which articles may be advanced. And as already explained, the present invention is extremely useful in connection with dumping malpositioned articles from a conveying surface where the articles are to be fed to and received by a cartoning or packaging machine and in a certain position.

Referring now to the drawings, an endless belt conveyer generally designated by the numeral 10 is shown in FIG. 1 which includes a belt 11 trained around spaced pulleys 12 and 13 carried on shafts 14 and 15. It will be appreciated that one of the shafts will be driven in order to power one of the pulleys and drive the conveyer belt. A suitable belt supporting and back up member 16 is preferably provided upon which the upper run of belt 11 travels. This support member will be carried by a frame for the conveyer in a suitable fashion. Further, the support member may extend beyond the belt at either one or both sides wherever desired in order to enable a suitable frame to be provided for the conveyer and its components.

Front and rear guide rails 17 and 18 are arranged in upstanding relationship above the conveyer belt 11 to guide the articles along the conveyer in a substantially rectilinear path. The rear guide rail 18 is stationary relative to the conveyer belt and arranged substantially along the rear edge 11a of the belt as can be seen particularly in FIG. 2. The front guide rail 17 is adjustably mounted on the conveyer frame by means of bracket members 19 having slots 20 for receiving bolts 21 secured to the frame support member 16. Thus, by loosening and tightening of the bolts 21 the front guide rails 17 may be adjusted along the upper surface of the conveyer belt 11 toward and away from the rear rails 18.

In order to remove the malpositioned articles from the conveyer, an offset portion, generally designated by the numeral 22, is provided along the guide rails 17 and 18. Along the front guide rail, the offset section includes a guide rail 23 having an elongated section 24 extending parallel to the edges of the conveyer belt and opposite inclined or angulated portions 25 and 26 that provide continuity with the front guide rail 17. A bracket 27 supports the guide rail 23 and may be adjustably secured to the support member 16 by means of a slot 28 and bolt 29 arrangement. Thus, loosening and tightening of the bolt 29 permits adjustment of the guide rail section 23 along the conveying surface of the belt 11.

Along the back rail 18, and at the left as seen in FIG. 2, an angulated portion 30 provides a continuation of the rail 18 and extends parallel to the angulated portion 25 of the front rail section 23. At the end of the angulated portion 30 a short guide rail section 31 arranged parallel to the portion 24 of the guide rail 23 extends and terminates at 32. At the right hand end of FIG. 2, it can be seen a like configuration in providing an angulated portion 33 extending parallel to the angulated portion 26 of the front guide rail 23 and a short section 34 extending parallel to the portion 24 of the front rail and terminating at 35. It may be noted that the angulated portions 30 and 33 of the back rail 18 project out and away from the rear edge 11a of the conveyer belt 11.

Between the terminal ends 32 and 35 of the rear guide rail, a single bar-shaped guide rail 36 is provided and as seen in FIG. 2 a front edge 36a is continuous with the guiding edge of the rear guide rail 18. This bar-shaped guide rail 36 is spaced above the upper conveying surface of the belt 11 to such an extent as to define an opening therewith and between the ends of the rear guide rail defined at 32 and 35. The opposite ends of the bar-shaped guide rail 36 have downwardly projecting support brackets 37 slotted at 38 to receive bolts 39 that are mounted on a part of the frame as defined at 40. Accordingly, the guide rail 36 may be adjusted up and downwardly to vary the distance from its lower surface 36b to the upper surface of the belt 11 in conformity to the size of the bottle to be handled.

The distance between the article engaging surfaces of the front and back guide rails 17 and 18, the section 24 of the rail 23 and the bar 36 and the sections 31 and 34, and the sections 25, 26 and 30, 33 is substantially the same and slightly greater than the width of the article guided therealong.

While bottles are illustrated as being handled by the apparatus of the invention, it will be appreciated that articles may also be handled with equal facility. In adjusting the rails to accommodate a bottle of the size and type designated by the numeral 41, the front and back rails are adjusted to a transverse dimension slightly greater than the maximum width of the bottle or in this case the diameter. The bar-shaped guide rail 36 is adjusted so that its lower surface 36b is at a distance from the upper surface of the conveyer belt 11 equal to slightly more than the diameter of the bottle 41. It may also be noted in FIG. 4 relative to the bottle 41a in phantom wherein the upper edge of the bottle just below the neck engages the surface 36a of the guide rail 36. It may be further noted in FIGS. 3 and 4 that the rails are adjusted so that the bottle is positioned in the offset portion 22 relative to the rear edge 11a of the conveyer so that substantially more than one-half of the bottle extends away from the edge 11a. Accordingly, the distance between the rear edge 11a of the belt 11 and the forward surface 24a of the guide rail portion 24 should be slightly less than one-half the maximum width dimension of a bottle or article. Further, the vertical distance between extended planes along the upper surface of the conveyer belt 11 and the lower surface 36b of the guide rail 36 should be slightly greater than the largest diameter or maximum dimension of a bottle or article. Thus, when a malpositioned bottle, such as shown in solid lines in FIG. 4, is conveyed along the offset portion 22, it will pass through the opening defined at the rear guide rails and below the guide rail 36 inasmuch as over half of the bottle extends over the edge 11a of the belt 11. And it should be appreciated that the distance between the terminal ends 32 and 35 of the rear guide rails must be substantially greater than the longest dimension or the height of the bottle or article in order for the bottle to pass through the opening. Thus, all bottles that are tipped over will be dumped from the conveyer at the offset portion, while the bottles in the upright position will pass along the offset section and on to the delivery end of the conveyer.

From the foregoing, it is seen that the present invention provides an inexpensive and foolproof mechanism for eliminating malpositioned bottles along a feeder conveyer.

It will be understood that modifications and variations may be effected without departing from the scope of the novel concepts of the present invention, but it is understood that this application is to be limited only by the scope of the appended claims.

The invention is hereby claimed as follows:

1. Apparatus for removing malpositioned elongated articles from a conveyer having a horizontal conveying surface and guide rails upstanding therefrom, said apparatus comprising an offset section along the guide rails for guiding the articles toward and along an edge of the conveyer, and an opening in the guide rail of the offset section which is positioned away from the edge of the conveyer, said opening sized to permit a malpositioned article lying on its side to pass therethrough and off the conveyer and to prevent correctly positioned upstanding articles from passing therethrough.

2. Apparatus for removing articles having a greater height than width from a conveyer when the articles are malpositioned, said apparatus comprising upstanding opposed guide rails along the conveyer for guidably maintaining the articles on the conveyer, an offset section along the guide rails for guiding the articles along an edge of the conveyer, and an opening in the rail of the offset section which is positioned away from the conveyer edge, said opening sized to permit articles malpositioned so that their shortest dimension extends upwardly from the conveyer to pass through said opening and drop off the conveyer.

3. Apparatus for removing articles having a greater height than width from a conveyer when the articles are malpositioned, said apparatus comprising upstanding opposed guide rails along the conveyer for guidably maintaining the articles on the conveyer, an offset section along the guide rails for guiding the articles along an edge of the conveyer, and an opening at the offset section in the rail extending away from the conveyer edge having a vertical dimension above the conveyer of slightly greater than the width of the article and a horizontal dimension substantially greater than the length of the article to permit only malpositioned articles to pass therethrough.

4. Apparatus for removing malpositioned articles from a conveyer wherein the articles have a greater height than width including, a pair of parallel spaced upstanding guide rails along the conveyer having a spacing therebetween slightly greater than the width of the articles, said guide rails having an offset section for guiding the articles along an edge of the conveyer so that slightly more than one-half of the article width projects off the conveyer, and an opening in the guide rail along the offset section which overlies an area away from the conveyer thereby permitting malpositioned articles to pass therethrough.

5. Apparatus for removing malpositioned articles from a conveyer wherein the articles have a greater height than width including, a pair of parallel spaced upstanding guide rails along the conveyer having a spacing therebetween slightly greater than the width of the articles, said guide rails having an offset section for guiding the articles along an edge of the conveyer so that slightly more than one-half of the article width projects off the conveyer, and an opening in the guide rail along the offset section which overlies an area away from the conveyer thereby permitting malpositioned articles to pass therethrough, said opening having a vertical dimension slightly greater than the width of the article and a horizontal dimension substantially greater than the height of the article.

6. In combination with the upper run of a belt conveyer, apparatus for guiding the path of bottles along the conveyer and for removing tipped over bottles therefrom, said apparatus comprising a pair of upstanding parallel rails along the conveyer belt arranged to maintain substantially all of each bottle on the belt and between the opposed edges thereof, an offset portion along said rails arranged to guide the bottles toward and along one edge of the conveyer belt, and an opening in the rail of the offset portion spaced outwardly of said belt for permitting tipped over bottles to pass therethrough when carried therealong.

7. In combination with the upper run of a belt conveyer, apparatus for guiding the path of bottles along the conveyer and for removing tipped over bottles therefrom, said apparatus comprising spaced sections including front and back parallel upstanding rails along the conveyer belt at the opposite ends of the upper run for maintaining substantially all of each bottle on the belt and between the opposed edges thereof, an offset portion along said conveyer having a front rail contiguous with the front rail of said spaced sections for guiding the bottles toward and along one edge of the conveyer belt and a back rail spaced above the conveyer belt a distance slightly greater than the maximum width of each bottle, and the front rail of the offset portion being spaced inwardly of the rear edge of the belt a distance equal to less than one-half the maximum width of each bottle.

8. The combination as defined in claim 7 wherein the back rails are fixed against movement along the horizontal and the front rails may be adjusted along the conveyer belt along the horizontal.

9. The combination as defined in claim 8, wherein the back rail in the offset portion is adjustable along the vertical.

References Cited in the file of this patent
UNITED STATES PATENTS 2,719,624     Fox _____ Oct. 4, 1955